United States Patent
Glauning

(10) Patent No.: US 8,531,161 B2
(45) Date of Patent: Sep. 10, 2013

(54) ENERGY CONSUMPTION OUTPUT DEVICE AND METHOD FOR OUTPUTTING A STILL REMAINING USABILITY

(75) Inventor: Rainer Glauning, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 13/122,941

(22) PCT Filed: Aug. 31, 2009

(86) PCT No.: PCT/EP2009/061189
§ 371 (c)(1),
(2), (4) Date: Apr. 6, 2011

(87) PCT Pub. No.: WO2010/049190
PCT Pub. Date: May 6, 2010

(65) Prior Publication Data
US 2011/0221396 A1   Sep. 15, 2011

(30) Foreign Application Priority Data
Oct. 28, 2008   (DE) .......................... 10 2008 043 212

(51) Int. Cl.
*H02J 7/00* (2006.01)
(52) U.S. Cl.
USPC ........................................................ 320/136
(58) Field of Classification Search
USPC ........................................................ 320/136
See application file for complete search history.

(56) References Cited

U.S. PATENT DOCUMENTS

| | | | | |
|---|---|---|---|---|
| 5,870,685 A * | 2/1999 | Flynn | ............................ | 455/573 |
| 6,313,832 B1 | 11/2001 | Ishida | | |
| 6,463,305 B1 | 10/2002 | Crane | | |
| 6,947,035 B1 * | 9/2005 | Shiraga | ......................... | 345/211 |
| 8,001,400 B2 * | 8/2011 | Fadell | ............................ | 713/320 |
| 8,055,314 B2 * | 11/2011 | Jin et al. | ........................ | 455/574 |
| 2007/0188144 A1 | 8/2007 | Hara et al. | | |

FOREIGN PATENT DOCUMENTS

| | | |
|---|---|---|
| DE | 10 344 359 | 5/2005 |
| EP | 18 818 604 | 8/2007 |
| EP | 1 873 541 | 1/2008 |
| WO | 98/10610 | 3/1998 |

\* cited by examiner

*Primary Examiner* — Ramy Ramadan
(74) *Attorney, Agent, or Firm* — Kenyon & Kenyon LLP

(57) ABSTRACT

An energy consumption output device for outputting the still remaining usability of an electrical consumer which may be connected to an energy storage. The energy consumption output device has the following features: a unit for providing a residual capacity of the electrical energy storage; a power consumption ascertainment unit which is configured to ascertain a power consumption rate in an instantaneous operating mode of the electrical consumer; and an output unit which is configured to determine information concerning the maximum usability for a user of the energy consumption output device with regard to the instantaneous operating mode, using the provided residual capacity and the ascertained power consumption rate, and to output this information.

16 Claims, 1 Drawing Sheet

ENERGY CONSUMPTION OUTPUT DEVICE AND METHOD FOR OUTPUTTING A STILL REMAINING USABILITY

FIELD OF THE INVENTION

The present invention relates to devices and methods by which the still remaining residual usability of an electrical consumer is easily assessable or predefinable by a user.

BACKGROUND INFORMATION

Present devices such as flashlights, for example, which are operated using energy storages (such as batteries, accumulators, and the like), always represent a trade-off between the (user's) objectives of maximum power output, for example brightness, and the longest possible operating period, for example burn time. For flashlights, for example, these objectives are generally taken into account by selecting a suitable luminous element having low consumption (for example, an LED light, etc.) and a suitable battery having the greatest possible capacity.

However, limits are imposed by objectives such as cost, weight, etc., which are no less important. As a result, for the above example either a maximum light output or a maximum burn time must be predetermined at the time of the design of the flashlight. The design is thus very inflexible with regard to various possible fields of application of the user. The burn time may be subsequently extended by the user only by purchasing another energy storage unit. However, not every activity for which the light is to be used requires the full light output, and in addition not every activity requires maximum burn time.

Similar problems of the inflexible design are also noted for other devices operated using an energy storage, for example battery-operated power tools, battery-operated gardening tools, electric vehicles, and the like.

SUMMARY OF THE INVENTION

An object of the exemplary embodiments and/or exemplary methods of the present invention, therefore, is to provide an option which allows a user of an electrical device to greatly expand the usability of these electrical devices, and thus to allow more flexible use of these devices.

This object is achieved by an energy consumption output device having the features described herein, the power specification device, the method for outputting the still remaining usability of a consumer, and the method for setting a residual usability of a consumer according to the further descriptions herein.

Further specific embodiments of the present invention result from the further descriptions herein.

The exemplary embodiments and/or exemplary methods of the present invention provides an energy consumption output device for outputting the still remaining usability of an electrical consumer which may be connected to an energy storage, the energy consumption output device having the following features:
  a unit for providing a residual capacity of the electrical energy storage;
  a power consumption ascertainment unit which is configured to ascertain in an instantaneous operating mode of the electrical consumer a consumption of power of the electrical consumer during an operating cycle, during a time interval, or for a specified distance segment; and
  an output unit which is configured to determine, with regard to the instantaneous operating mode, information concerning the maximum operating cycles still to be carried out using the energy storage, concerning a maximum operating period, or concerning a maximum range for a user of the energy consumption output device, using the provided residual capacity and the ascertained power consumption, and to output this information.

Moreover, the exemplary embodiments and/or exemplary methods of the present invention provides a method for outputting the still remaining usability of an electrical consumer which may be connected to an energy storage, the method having the following steps:
  ascertaining the power consumption rate for the power consumption in an instantaneous operating mode of the electrical consumer; and
  outputting information concerning the maximum usability with regard to the instantaneous operating mode, the information to be output being determined using the determined residual capacity and the ascertained power consumption rate.

The exemplary embodiments and/or exemplary methods of the present invention is based on the recognition that, by ascertaining the remaining maximum usability of the electrical energy storage for a predefined operating mode, a user is able to estimate how long or how often the electrical consumer, which is an electric motor of an electric vehicle, or an electric power tool, or an electrically operated light, for example, may be used before the electrical energy storage is depleted. This determined maximum usability is estimated by ascertaining the (for example, average) power consumption of the electrical consumer (power consumption rate) for the currently set operating mode, and extrapolating this power consumption to a future time. Using the knowledge of the instantaneous residual capacity of the electrical consumer and the power consumption which is extrapolated to a future time, it may thus be easily determined for how many operating cycles, for how long, or (for an electric vehicle) for what distance (range) the energy in the electrical energy storage is still sufficient for operating the electrical consumer.

The exemplary embodiments and/or exemplary methods of the present invention offers the advantage that the user no longer has to estimate on his own (which is usually not precise enough) for how long he is able to continue to withdraw electrical energy from the electrical energy storage before it is depleted. Thus, the user may restrain the use of the electrical consumer to the remaining usable energy in the energy storage, and may possibly avoid activating the electrical consumer when this is not absolutely necessary. For example, a tire may be quickly changed at night when not much light from the battery-powered light remains. This prevents the user from being prematurely warned of an imminent failure of the electrical consumer due to a lack of available energy, since the still remaining usability may be continuously indicated.

According to another aspect, a power specification device is provided for setting a residual usability of an electrical consumer which may be connected to an energy storage, the power specification device having the following features:
  a unit for providing a residual capacity of the electrical energy storage;
  a power consumption ascertainment unit which is configured to ascertain a power consumption rate in an instantaneous operating mode of the electrical consumer;
  a receiver unit which is configured to receive information concerning a desired residual usability, and
  a control unit in order to operate the electrical consumer, using the received information concerning the desired residual usability and power consumption rate of the electrical consumer, so that the consumer may be operated with at least the desired residual usability by the electrical consumer.

According to another aspect, a method is provided for setting a residual usability of an electrical consumer which may be connected to an energy storage, the method having the following steps:

determining a residual capacity of the electrical energy storage;

ascertaining a power consumption in an instantaneous operating mode of the electrical consumer in order to ascertain a power consumption rate; and receiving information concerning a desired residual usability, and operating the electrical consumer, using the received information concerning the desired residual usability and the power consumption rate of the electrical consumer, so that the consumer may be operated with at least the desired residual usability.

Frequently, when beginning his activity or starting operation of the electrical consumer, the user may estimate the level of his usage requirement (for example, in the form of required operating cycles, required operating period, and the like). With the aid of the power specification device the user may then specify the residual usability, thus setting the optimal operating mode of the consumer based on the power consumption for the instantaneous operating mode and the residual capacity of the electrical energy storage. The usage requirement is indicated as the operating period, operating cycles (for example, screw driving operations for a battery-powered screwdriver, revolutions of a motor, and the like), or as a range (for vehicles). A user may thus easily select the optimal operating mode of the electrical consumer so that the available residual capacity is divided up in such a way that it is just sufficient for the predefined usage requirement.

In another specific embodiment of the present invention, the power consumption ascertainment unit is configured to query from a memory the power consumption rate of the electrical consumer for the instantaneous operating mode. This allows a power consumption rate determined at the manufacturing plant to be set for an instantaneous operating mode, so that the power consumption no longer has to be determined by measurement over a time interval. This offers the advantage of a faster, and usually more accurate, indication of the maximum usability of the electrical consumer, using the residual energy stored in the electrical energy storage.

It is also advantageous if the power consumption ascertainment unit is configured to ascertain, for each operating mode of a plurality of operating modes, the power consumption rate of the electrical consumer, a different power being withdrawn from the electrical energy storage in the individual operating modes. By switching from an operating mode having a high power consumption to an operating mode having a low power consumption, it is thus possible to conserve energy from the electrical energy storage and thus ensure longer usability of the electrical consumer. However, in the various operating modes the still remaining usability may always be determined for the electrical consumer, so that a user of the energy consumption output device may set or also change the optimal operating mode for the desired purpose or the desired period of use.

The power consumption ascertainment unit may also have a switching unit which is configured to switch the electrical consumer between various operating modes. This advantageously allows manual switching when a user recognizes during operation of the energy consumption output device that he would like to use the electrical consumer for a longer or a shorter time, and he would like to test whether the electrical energy storage still has sufficient energy available for the longer or shorter period of use. If this is the case, the user may switch the electrical consumer to the appropriate operating mode and continue operation of the electrical consumer in the other operating mode, optimal use being made of the remaining energy in the electrical energy storage.

Additionally or alternatively, the power consumption ascertainment unit may have an input unit which is configured to receive via a user entry a desired operating period, a desired number of operating cycles, or a desired travel distance of the electrical consumer, and, using the received operating period, the received number of operating cycles, or the received travel distance, and knowledge of a power consumption characteristic of the electrical consumer, for example a power consumption characteristic curve, to ascertain the operating mode of the electrical consumer in which the desired operating period, the desired number of operating cycles, or the desired travel distance may be performed by the electrical consumer. This offers the advantage that when beginning his activity or starting operation of the electrical consumer, the user himself may estimate the level of his usage requirement, so that, using the energy consumption output device, the optimal operating mode is then ascertained from the power consumption data, and the residual capacity of the electrical energy storage is ascertained. A user may thus always select the optimal operating mode of the electrical consumer for which the energy stored in the electrical energy storage is just sufficient during the desired use.

In another specific embodiment of the present invention, the unit is configured for determining a residual capacity of the electrical energy storage in order to determine the residual capacity of the electrical energy storage by analyzing a voltage at the electrical energy storage and/or analyzing a current from the electrical energy storage, in particular by analyzing a linear relationship between the current and the voltage. Such a determination of the residual capacity is very simple for lithium ion batteries in particular, since a very simple numerical or circuitry-based determination of the residual capacity is provided by the option for linear analysis. When other batteries are used, the residual capacity may be similarly analyzed using an appropriate battery characteristic curve for the residual capacity, based on the current-voltage relationship.

In particular, the power consumption rate may correspond to a power consumption of the electrical consumer during an operating cycle, during a time interval, or for a specified distance segment. In addition, the information concerning the maximum usability may correspond to the maximum operating cycles still to be carried out using the energy storage, a maximum operating period, or maximum range. In particular, the desired residual usability may correspond to an operating period, a desired number of operating cycles, or a desired range of the electrical consumer.

It is also advantageous if an electrical device has the following features:

an electrical energy storage for providing maximum electrical supply energy for an electrical consumer;

an energy consumption output device which is connected to the electrical energy storage, as also described in variations above; and an electrical consumer which is linked to the energy consumption output device and to the electrical energy storage.

In such a specific embodiment of the present invention the advantages according to the present invention are particularly apparent, since in this case due to the installation of the electrical energy storage and the electrical consumer, the corresponding parameters for determining the residual capacity of the electrical energy storage as well as the parameters of the power consumption of the electrical consumer may be stored in the energy consumption output device, directly at the manufacturing plant. This prevents a user of the energy consumption output device from possibly incorrectly entering these values when setting this device to the specific use situation.

It is particularly advantageous if an electric power tool, electric vehicle, or battery-operated lighting device includes the above-described electrical device. The advantages stated above are particularly apparent in this case, since the user of the electric power tool, the electric vehicle, or the battery-operated lighting device need not be concerned that, shortly before concluding his work activities, or shortly before reaching his destination in the electric vehicle, or shortly before ending his activity for which he needs light from the battery-powered light, he must stop use of the particular device because the electrical energy storage no longer supplies this device with power. Instead, the user is able to estimate in a timely manner when he must conclude his activity, since the device is then no longer available.

In another specific embodiment of the present invention, a computer program containing program code for carrying out steps of the above-described method may also be provided when the computer program is executed on a data processing system. In particular the steps which are based on a computation rule may thus be efficiently carried out by a data processing system.

The exemplary embodiments and/or exemplary methods of the present invention are explained in greater detail below as an example, with reference to the appended figures of the drawing.

DETAILED DESCRIPTION

Figure 1:
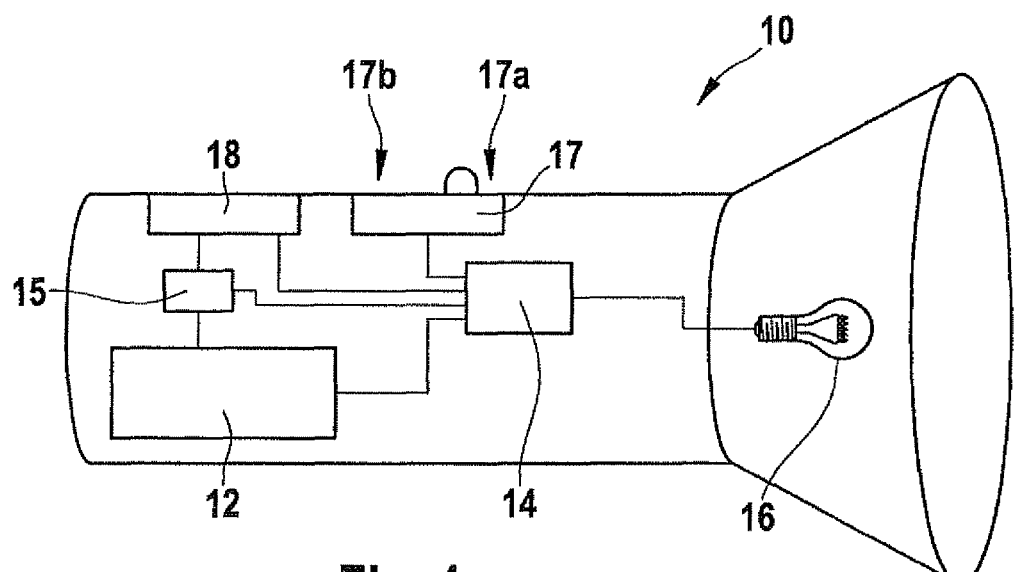
FIG. 1 shows a schematic block diagram of a first exemplary embodiment of the present invention, as a device.

Any stated dimensions and measurements are only examples, so that the present invention is not limited to these dimensions and measurements. In addition, the figures of the drawing, the description thereof, and the claims contain numerous features in combination. It is clear to one skilled in the art that these features may also be considered individually, or combined to form further combinations not explicitly described herein.

FIG. 1 shows a block diagram of a first exemplary embodiment of the present invention. FIG. 1 illustrates an electrical device 10 which has an electrical energy storage 12, a power consumption ascertainment unit 14, and a consumer 16 which are connected to one another. Electrical device 10 is configured as a flashlight in FIG. 1, although the present invention is not limited to such an embodiment of an electrical device 10.

Electrical energy storage 12 may be configured to be depletable and/or rechargeable, for example in the form of a rechargeable battery. Electrical device 10 also includes a unit 15 which is configured to determine the residual capacity of electrical energy storage 12, and to transmit the residual capacity or information concerning same to power consumption ascertainment unit 14 and/or a display unit 18. In FIG. 1, consumer 16 is a light bulb. In other specific embodiments of the present invention, the electrical device as an electrical energy storage 12 may also have a conventional battery, and/or as a consumer 16 may have an electric motor, for example.

According to the first exemplary embodiment of the present invention, power consumption ascertainment unit 14 is configured in such a way that it is able to determine a power consumption of electrical consumer 16. To this end, for example, the energy received by the electrical consumer may be measured over a given test period in an instantaneous operating mode of the electrical consumer, and on this basis a power consumption rate of this consumer in the instantaneous (tested) operating mode may be determined. Alternatively or additionally, a memory may be provided in which the appropriate power consumption rates are stored for the instantaneous operating mode (or multiple different operating modes) of consumer 16, so that power consumption ascertainment unit 14 only needs to read out this stored value. This dispenses with the time-consuming measurement of the power consumption of consumer 16. With knowledge of the power consumption rate of electrical consumer 16 and the residual capacity of electrical energy storage 12, the maximum usability for which electrical energy storage 12 is still able to provide energy may then be estimated. For example, the maximum usability may be indicated as a number of operating cycles of an electric power tool, a maximum illumination period of a battery-powered light, or a maximum range of an electric vehicle, using the energy, consumption output device. The maximum usability may be determined by computing a ratio of the ascertained residual capacity to the determined power consumption rate of consumer 16 in the operating mode under consideration. This maximum usability may then be displayed to a user of electrical device 10, for example via display unit 18.

To provide a user of electrical device 10 with the option to adjust the power consumption of electrical consumer 16 (i.e., to switch the electrical consumer to various operating modes), switching may be performed to a high (position 17a) or a low (position 17b) power consumption of consumer 16 via a power selector switch 17. It is also possible to switch between multiple (in particular more than two) different power consumption rates. Power selector switch 17 is connected to power consumption ascertainment unit 14, so that the corresponding power consumption rate may be ascertained also for the different operating modes. In addition, a stepless switch between various (in particular also more than two) power consumption modes of consumer 16 is possible. This switching of the power consumption rates of electrical consumer 16 allows the user to adjust the intensity of operation of electrical consumer 16 of electrical device 10, depending on the particular activities to be performed. For example, for changing a tire at night, a high light output from a battery-powered light as electrical device 10 may be required in order to change the tire as quickly as possible (which also results in a short illumination period); alternatively, a walk at night does not require a high light output from the same battery-powered light, so that in this case a long illumination period is possible. The operator of the battery-powered light (as electrical device 10) may then make the appropriate setting via power selector switch 17, and the remaining maximum illumination period may then be determined by the energy consumption output device and displayed via display unit 18.

In another embodiment, an input unit (not illustrated in FIG. 1) may also be provided, via which a user may enter a request for a remaining use option. Based on the power consumption rate of electrical consumer 16 in the different operating modes, this request is then used to compute/find the particular operating mode for which the duration and intensity of use of electrical consumer 16 at least corresponds to the request entered by the user. This ensures that the user is provided with sufficient power for operating electrical consumer 16, at least for the duration of the desired use scenario.

The present invention has been described above using the example of a battery-powered light. Using the above assumption, it is possible with only a light and a specified battery pack (i.e., a predefined capacity) to more flexibly adjust the light to the work task according to the following aspects:

- a maximum light output may be set, with a trade-off for the burn time (for example, changing a tire briefly at night, etc.);
- a maximum burn time may be set, with a trade-off for the light output (for example, longer walking at night);
- maximum burn time and light output may also be set in a stepless manner, or in more than two steps;
- cost savings may be realized, since the objectives of maximizing both the burn time and the light output may be achieved at the same time due to this improved flexibility (otherwise, for a given unchangeable maximum light output, an increase in burn time would be possible only via a larger and therefore more expensive battery);
- weight savings are possible (smaller and therefore lighter battery);
- a reduction in size is possible, since a smaller battery and less than proportionately larger space requirements for an electronics system are required (in particular when a lithium ion battery is used, since this battery is operated with a control electronics system anyway).

Power consumption ascertainment unit 14 may be implemented, for example, in the form of a "remaining life preselect/display" in the electronics system, which is mandatory for devices operated by lithium ion batteries. To protect the lithium ion battery, machine (control) electronics systems currently already detect and process the variables of battery voltage, current, and temperature. In particular for the "battery voltage" and "current" variables, information is present for deducing the lithium ion battery charge state and ascertaining the instantaneous power setting. It is necessary only to appropriately supplement the software and install a display (if not already present) in order to implement an automatic control of the optimal burn time and the optimal lighting intensity, using power consumption ascertainment unit 14.

Using such an electronics system as a power consumption ascertainment unit, it is possible (using a lithium ion battery-powered light as an example of electrical device 10) to indicate the (remaining) burn time (based on a specified or measured battery capacity and a predefined or set (light) output), using a display. In addition, the (light) output may be appropriately adjusted based on a predefined or measured battery capacity and a specified or set default burn time. Since for the use of a lithium ion battery as electrical energy storage 12 an electronics system should be used anyway for protection of the battery, the (remaining) capacity may also be easily determined with the aid of this electronics system, for example by measuring the battery voltage.

The present invention thus provides an approach which allows a user of the present invention to display and individually adjust the operating period (the burn time, for example) or the operating power (the light output, for example) as a function of his work task.

The present invention has been explained in greater detail above with reference to a battery-powered light. However, it is obvious to one skilled in the art that the present invention may also be implemented in any other given electrical device. Thus, by using the present invention, similar design, cost, and user advantages may also be achieved in other products having a relatively constant (mechanical, electrical, optical, and/or acoustical) power output in a predefined range. Examples of such products may be found in the areas of lights, fans, radios (radio volume), pumps, vibrators, grinders, grass shears, lawn mowers, etc.

For products in which a power output may be adjusted relatively dynamically over a wide range, the advantages likewise predominate for a user of an electrical device configured in this way, since the user knows how long he may still use the electrical device without charging the electrical energy storage, or how many similar uses he is still able to perform. Examples of such products having relatively high dynamic power output may be found in the areas of screwdrivers, hammer drills, jigsaws, circular saws, vehicles, ships, submarines, aircraft, helicopters (model-making), etc., to name only a few. If the electrical device is to be used in applications having very high dynamic power requirements, an appropriate extrapolation algorithm should be implemented which allows power control of the consumer beyond the existing range limits (for example, permanently programmed into the power consumption ascertainment unit).

Figure 2:
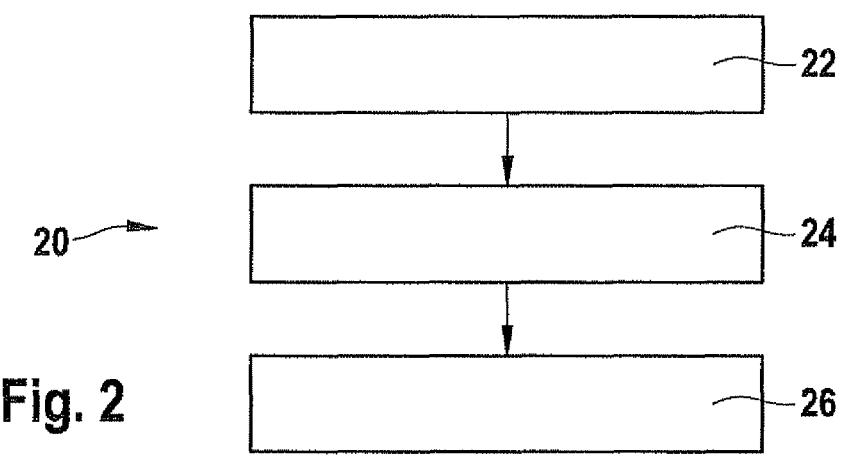
FIG. 2 shows a flow chart of a second exemplary embodiment of the present invention, as a method.

FIG. 2 shows a flow chart of a second exemplary embodiment of the present invention as a method 20 for indicating the still remaining usability of an electrical consumer which may be connected to an energy storage. Method 20 includes a first step of determining 22 a residual capacity of electrical energy storage 12, and a second step of ascertaining 24 the power consumption rate in an instantaneous operating mode of electrical consumer 16 in order to ascertain a power consumption of electrical consumer 16 during an operating cycle (for example, drilling, sawing, and the like), during a time interval, or for a specified distance segment (for vehicles). First step 22 and second step 24 may also be carried out simultaneously. A third step involves outputting 26 information concerning the maximum operating cycles still to be carried out using energy storage 12, concerning a maximum operating period, or concerning a maximum range with regard to the instantaneous operating mode, the information to be indicated being determined using the determined residual capacity and the ascertained power consumption rate.

What is claimed is:

1. An energy consumption output device for outputting the still remaining usability of an electrical consumer, which is connectable to an energy storage, comprising:
   a unit for providing a residual capacity of the electrical energy storage;
   a power consumption ascertainment unit, which is configured to ascertain a power consumption rate in an instantaneous operating mode of the electrical consumer; and
   an output unit, which is configured to determine, with regard to the instantaneous operating mode, information concerning the maximum usability, using the provided residual capacity and the ascertained power consumption rate, and to output this information;
   wherein the power consumption ascertainment unit is configured to query from a memory the power consumption rate of the electrical consumer for the instantaneous operating mode.

2. A power specification device for setting a residual usability of an electrical consumer, which is connectable to an energy storage, comprising:
   a unit for providing a residual capacity of the electrical energy storage;

a power consumption ascertainment unit, which is configured to ascertain a power consumption rate in an instantaneous operating mode of the electrical consumer;

a receiver unit, which is configured to receive information concerning a desired residual usability; and a control unit to operate the electrical consumer, using the received information concerning the desired residual usability and power consumption rate of the electrical consumer, so that the electrical consumer is operable with the desired residual usability by the electrical consumers wherein the power consumption ascertainment unit is configured to query from a memory the power consumption rate of the electrical consumer for the instantaneous operating mode.

3. The device of claim 1, wherein the power consumption ascertainment unit is configured to ascertain, for each operating mode of a plurality of operating modes, the power consumption rate of the electrical consumer, a different power being withdrawn from the electrical energy storage in the individual operating modes.

4. The device of claim 1, wherein the power consumption ascertainment unit also has a switching unit, which is configured to switch the electrical consumer between various operating modes.

5. The device of claim 1, wherein the unit is configured for determining a residual capacity of the electrical energy storage to determine the residual capacity of the electrical energy storage by at least one of (i) analyzing a voltage at the electrical energy storage, and (ii) analyzing a current from the electrical energy storage, by analyzing a linear relationship between the current and the voltage.

6. The device of claim 1, wherein the power consumption rate corresponds to a power consumption of the electrical consumer during an operating cycle, during a time interval, or for a specified distance segment.

7. The device of claim 1, wherein the information concerning the maximum usability corresponds to the maximum operating cycles still to be carried out using the energy storage, a maximum operating period, or a maximum range.

8. The device of claim 1, wherein the desired residual usability corresponds to an operating period, a desired number of operating cycles, or a desired range of the electrical consumer.

9. An electrical device, comprising:
an electrical consumer;
an electrical energy storage for providing a maximum electrical supply energy for the electrical consumer, and the electrical consumer linked to the device and to the electrical energy storage;
an energy consumption output device for outputting the still remaining usability of the electrical consumer, which is connectable to an energy storage, including:
a unit for providing a residual capacity of the electrical energy storage;
a power consumption ascertainment unit, which is configured to ascertain a power consumption rate in an instantaneous operating mode of the electrical consumer; and
an output unit, which is configured to determine, with regard to the instantaneous operating mode, information concerning the maximum usability, using the provided residual capacity and the ascertained power consumption rate, and to output this information, which is connected to the electrical energy storage;

wherein the power consumption ascertainment unit is configured to query from a memory the power consumption rate of the electrical consumer for the instantaneous operating mode.

10. A method for outputting the still remaining usability of an electrical consumer, which is connectable to an energy storage, the method comprising:
determining a residual capacity of the electrical energy storage;
ascertaining the power consumption rate for the power consumption in an instantaneous operating mode of the electrical consumer by a power consumption ascertainment unit; and
outputting information concerning the maximum usability with regard to the instantaneous operating mode, the information to be output being determined using the determined residual capacity and the ascertained power consumption rate;
wherein the power consumption ascertainment unit is configured to query from a memory the power consumption rate of the electrical consumer for the instantaneous operating mode.

11. The method of claim 10, wherein one of a desired operating period, a desired number of operating cycles, and a desired range of the electrical consumer is predefined as information concerning the maximum usability, the electrical consumer being operated using the received information concerning the operating period, the number of operating cycles, the range and the power consumption rate of the electrical consumer, so that the consumer may be operated one of for the indicated operating period, for the indicated number of operating cycles, and for the indicated range.

12. A method for setting a residual usability of an electrical consumer, which is connectable to an energy storage, the method comprising:
determining a residual capacity of the electrical energy storage;
ascertaining a power consumption in an instantaneous operating mode of the electrical consumer to ascertain a power consumption rate by a power consumption ascertainment unit;
receiving information concerning a desired residual usability; and
operating the electrical consumer, using the received information concerning the desired residual usability and the power consumption rate of the electrical consumer, so that the consumer may be operated with at least the desired residual usability;
wherein the power consumption ascertainment unit is configured to query from a memory the power consumption rate of the electrical consumer for the instantaneous operating mode.

13. A computer readable medium having a computer program, which is executable by a processor, comprising:
a program code arrangement having program code for outputting the still remaining usability of an electrical consumer, which is connectable to an energy storage, by performing the following:
determining a residual capacity of the electrical energy storage;
ascertaining the power consumption rate for the power consumption in an instantaneous operating mode of the electrical consumer by a power consumption ascertainment unit; and
outputting information concerning the maximum usability with regard to the instantaneous operating mode, the information to be output being determined using the determined residual capacity and the ascertained power consumption rate;

wherein the power consumption ascertainment unit is configured to query from a memory the power consumption rate of the electrical consumer for the instantaneous operating mode.

14. An electric power tool, comprising:

an electrical device, including:
- an electrical consumer;
- an electrical energy storage for providing a maximum electrical supply energy for the electrical consumer, and the electrical consumer linked to the device and to the electrical energy storage;
- an energy consumption output device for outputting the still remaining usability of the electrical consumer, which is connectable to an energy storage, including:
  - a unit for providing a residual capacity of the electrical energy storage;
  - a power consumption ascertainment unit, which is configured to ascertain a power consumption rate in an instantaneous operating mode of the electrical consumer; and
  - an output unit, which is configured to determine, with regard to the instantaneous operating mode, information concerning the maximum usability, using the provided residual capacity and the ascertained power consumption rate, and to output this information, which is connected to the electrical energy storage; and wherein the power consumption ascertainment unit is configured to query from a memory the power consumption rate of the electrical consumer for the instantaneous operating mode.

15. An electric vehicle, comprising:

an electrical device, including:
- an electrical consumer;
- an electrical energy storage for providing a maximum electrical supply energy for electrical consumer, and the electrical consumer linked to the device and to the electrical energy storage;
- an energy consumption output device for outputting the still remaining usability of the electrical consumer, which is connectable to an energy storage, including:
  - a unit for providing a residual capacity of the electrical energy storage;
  - a power consumption ascertainment unit, which is configured to ascertain a power consumption rate in an instantaneous operating mode of the electrical consumer; and
  - an output unit, which is configured to determine, with regard to the instantaneous operating mode, information concerning the maximum usability, using the provided residual capacity and the ascertained power consumption rate, and to output this information, which is connected to the electrical energy storage; and wherein the power consumption ascertainment unit is configured to query from a memory the power consumption rate of the electrical consumer for the instantaneous operating mode.

16. A battery-operated lighting device, comprising:

an electrical device, including:

an electrical consumer;

an electrical energy storage for providing a maximum electrical supply energy for the electrical consumer, and the electrical consumer linked to the device and to the electrical energy storage;

an energy consumption output device for outputting the still remaining usability of the electrical consumer, which is connectable to an energy storage, including:

a unit for providing a residual capacity of the electrical energy storage;

a power consumption ascertainment unit, which is configured to ascertain a power consumption rate in an instantaneous operating mode of the electrical consumer; and an output unit, which is configured to determine, with regard to the instantaneous operating mode, information concerning the maximum usability, using the provided residual capacity and the ascertained power consumption rate, and to output this information, which is connected to the electrical energy storage; and wherein the power consumption ascertainment unit is configured to query from a memory the power consumption rate of the electrical consumer for the instantaneous operating mode.

* * * * *